R. H. LONGBRAKE.
RAILROAD CROSSING GATE.
APPLICATION FILED FEB. 14, 1916.

1,211,194.

Patented Jan. 2, 1917.

WITNESSES:

INVENTOR:
Russell H Longbrake

UNITED STATES PATENT OFFICE.

RUSSELL H. LONGBRAKE, OF DEL SUR, CALIFORNIA.

RAILROAD-CROSSING GATE.

1,211,194.   Specification of Letters Patent.   Patented Jan. 2, 1917.

Application filed February 14, 1916. Serial No. 78,242.

*To all whom it may concern:*

Be it known that I, RUSSELL H. LONGBRAKE, a citizen of the United States, residing at Del Sur, in the county of Los Angeles and State of California, have invented a new and useful Railroad-Crossing Gate, of which the following is a specification.

My invention relates to improvements in railroad crossing gates which are operated through electro-magnetic devices by approaching and departing trains; and the objects of my improvement are, first, to provide means for closing the gate sufficiently in advance of an approaching train to prevent vehicles and pedestrians from crossing the track at that time; second, to maintain the gate in closed position until the train has passed the crossing, and so long as there is any danger from other approaching trains; third, to cause the gate to open when all danger is passed; and, fourth, to accomplish the above, and to operate the gates, by means of a storage battery, or other source of electricity, carried on the locomotives or cars.

I attain these objects by the mechanism illustrated in the accompanying drawing, in which—

Figure 1:
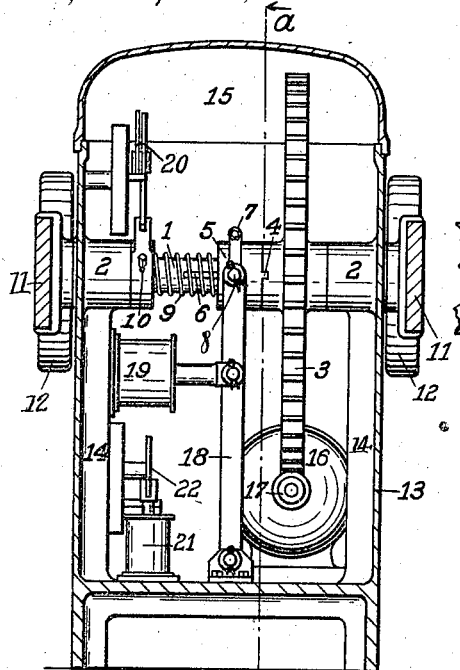
Figure 2:
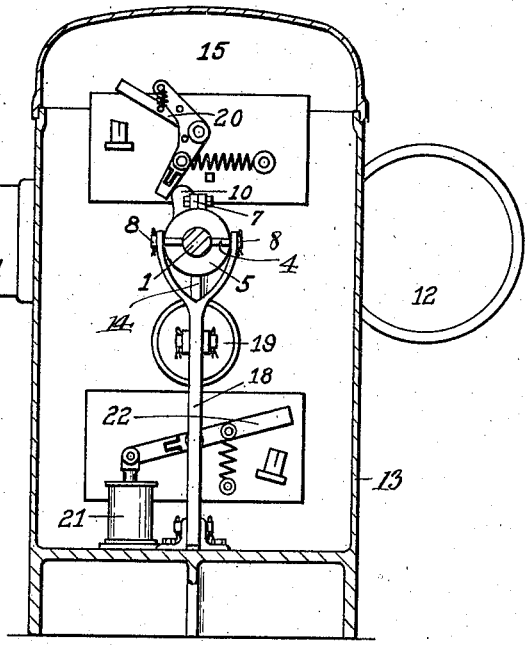
Figure 3:
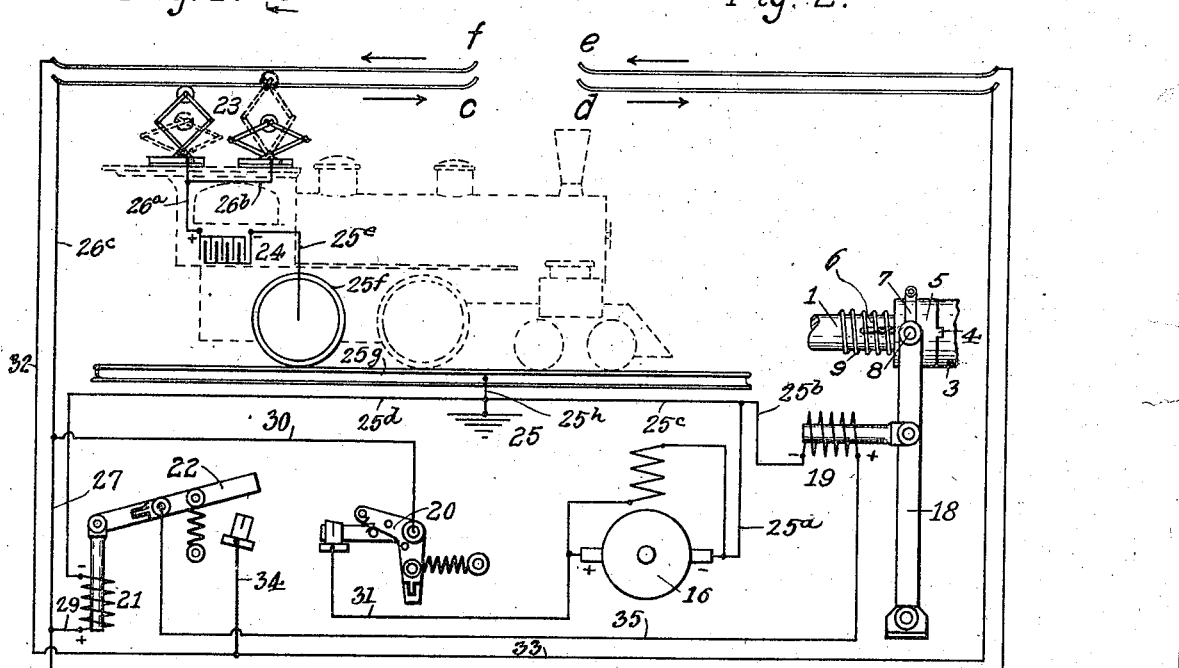

Figure 1 is a vertical section of the crossing gate housing, showing the inclosed mechanism; Fig. 2 is a vertical section on the line *a b* of Fig. 1; and Fig. 3 is a wiring diagram showing the arrangement of the electrical circuits, when one side of the system is grounded.

The same figures refer to similar parts throughout the several views on the drawing.

The gate shaft 1, is supported by, and revolves in bearings 2, and carries, rigidly mounted upon it, the gate bars 11. The bearings 2 are shown as an integral part of the housing 13, which is stiffened and strengthened by the webs 14. There is a suitable cover, 15, for the housing, arranged in such a manner as to afford a water tight joint. Mounted upon shaft 1, but not keyed or attached to it, and free to revolve upon it, is the gear 3 driven by electric motor 16 through worm 17.

At 5 is shown a collar which is free to slide upon shaft 1, but is keyed to it by key 6, so that shaft and collar must revolve together. This collar also has a key, 4, upon its end face which is adjacent to the gear 3, which engages a similar keyway in the end face of the hub of the gear. When so engaged the gear 3, collar 5, and shaft 1 will necessarily revolve together.

At 7 is shown a yoke encircling the collar 5, and fitting into a circumferential groove of the latter. Yoke 7 has two trunnions, 8, by means of which it is connected to lever 18, which controls its position. A compression spring 9 normally keeps collar 5 against the face of the hub of gear 3, and the key 4 in engagement.

At 10 is shown a collar, mounted upon the shaft 1, and rigidly attached to it by means of a set screw in proper angular relation to the crossing bars 11. This collar, 10, has a lug, or cam, serving to engage and operate the quick break limit switch 20 when the gate has become closed.

At 19 is shown a solenoid capable of acting through its plunger upon lever 18, thereby moving collar 5 against the compression spring 9, and liberating gear 3 from engagement with the shaft 1. When this happens the shaft 1 will be free to turn within the gear and the gate will be opened through the overbalancing effect of the weights 12.

At 21 is a solenoid capable of acting through its plunger upon switch 22 against a tension spring which normally keeps the switch closed. The purpose of switch 22 is to prevent the possibility of two conflicting tendencies being impressed upon the gate mechanism at the same time. If the gate should be closed or closing, switch 22 will be open, thereby breaking the circuit controlling the gate releasing mechanism, and preventing any chance of the gate having a tendency to open instead of close.

At 23 are shown two pantograph devices mounted upon the locomotive cab. One of these is for contact with trolleys *c* and *d*, and the other for contact with trolleys *e* and *f*, for forward and backward motion of the train respectively. Only one of these pantograph devices will be in operation at any one time, there being one pantograph for each directing train motion.

At 24 there is shown a storage battery carried by the train for the purpose of operating all of the crossing gates. Instead of a battery a suitable electric generator might be employed, the source of the necessary electric energy to operate the system forming no part of my present invention, but its location upon the train being an essential part of it.

In the arrangement of wiring shown in Fig. 3, the negative terminals of the motor 16, solenoid 19, and solenoid 21, are permanently connected to the ground 25 through the wires 25$^a$, 25$^b$, 25$^c$, and 25$^d$ respectively. The negative terminal of the battery 24 is also connected to ground through wire 25$^e$, locomotive wheel 25$^f$, rail 25$^g$, and rail grounding connection 25$^h$. From the positive terminal of the battery 24, wires 26$^a$ and 26$^b$ lead, respectively, to the two pantographs. One of these pantographs is adapted to make electrical contact with trolleys $c$ and $d$, and the other pantograph is adapted to make electrical contact with trolleys $e$ and $f$. Only one pantograph will be in operation at any one time, the one being used depending upon the direction of the motion of the train. Trolleys $c$ and $e$ are on opposite sides of the railroad crossing, but each is on the "near" side of the crossing with respect to an approaching train. These two trolleys are in permanent electrical connection through wires 26$^c$, 27, and 28. A branch wire 29 connects 27 with the positive terminal of the solenoid 21. A branch wire 30 connects 26 with one terminal of the switch 20, the other terminal of which is connected to the positive terminal of the motor 16 through the wire 31. Trolleys $d$ and $f$ are on opposite sides of the railroad crossing, but each is on the "far" side of the crossing with respect to an approaching train. These two trolleys are in permanent electrical connection through wires 32 and 33. A branch wire 34 connects 32 with one terminal of the switch 22, the other terminal of which is connected to the positive terminal of the solenoid 19 by means of the wire 35.

In the manner just described the positive terminals of all of the electrical devices that control the closing of the gate are connected to the trolleys $c$ and $e$, and the positive terminals of the electrical devices that have to do with the opening of the gate are connected to trolleys $d$ and $f$.

The operation of my invention is as follows: As a train approaches a crossing equipped with my gate, one of its pantographs will make contact with one of the trolleys $c$ or $e$, depending upon the direction in which the train is moving. This will complete the circuit from the battery through the gate closing devices to the ground in the manner described. The solenoid 21 will be energized and through the medium of its pull upon its plunger will open the switch 22. This will have the effect of opening the circuit through the solenoid 19 in case it should be closed, and keeping it open in case it should otherwise be completed. Solenoid 19 will thus be rendered inoperative so long as a pantograph is in contact with trolley $c$ or $e$, and there can be no electrical tendency to open the gate. Coincidently with the above, if the gate is then open, the circuit through the motor 16 will be completed through the switch 20, and the motor will start up and close the gate. Should the gate be already closed, however, through the passing of a train on another track, the switch 20 will be open through the action of the mechanism already described, and the motor will remain open circuited. The switch 20 is shown in open position in Fig. 2 due to the action of the lug 10 on the gate shaft. It occupies this position when the gate is completely closed. As soon as the train has passed the crossing its pantograph leaves trolley $c$, or $e$, thereby opening the circuit of the motor 16 and the solenoid 21. As the latter is then inoperative, the switch 22 will be closed by the action of its tension spring. No further action of the mechanism will then take place until the train has cleared the crossing, and its pantograph has made contact with trolley $d$ or $f$, depending upon the direction of train motion. When this takes place, provided there are no other trains approaching the crossing, the solenoid 19 will be energized through switch 22, which will then be in closed position. Solenoid 19 will then exert a pull, by means of its plunger, upon lever 18, thereby releasing the gate shaft 1 in the manner previously described, and allowing the gate to open by gravity through the action of its counter weights.

In the arrangement of connections shown, all of the electrical devices have one side permanently connected to ground at 25. I prefer to install the device in this manner as it simplifies and reduces the cost of the work. Other arrangements of the wiring and circuits are possible and will occur to those familiar with the art. I have not deemed it necessary to illustrate all these specific arrangements herein, but together with the arrangement I have submitted for illustrative purposes, they are comprehended within the scope of my invention.

I claim:

1. In a railroad crossing gate, the combination of a gate; counter weights for raising the gate; an electric motor for lowering the gate; an electric circuit for said motor adapted to be closed by trains that are approaching the crossing; means for opening the motor circuit when the gate has reached its closed position; a solenoid adapted for releasing the gate from its closing mechanism, so as to allow it to be raised by the action of said counter weights; an electric circuit for said solenoid adapted to be closed by trains that have passed the crossing; means for preventing the closing of the solenoid circuit when a train is approaching the crossing; and a source of electricity adapted for operating said electric circuits.

2. In a railroad crossing gate, the combination of a gate; an electric motor for closing the gate; an electric circuit for the motor that is adapted to be closed by trains that are approaching the crossing; an automatic switch for opening the motor circuit when the gate has closed; a solenoid for releasing the gate from its closing mechanism; an electric circuit for said solenoid that is adapted to be closed by trains that have passed the crossing; a switch in said solenoid circuit that is normally closed but adapted to be opened by trains that are approaching the crossing; a source of electricity adapted for operating said electric circuits; and counter weights for opening the gate when it has been released from its closing mechanism.

3. In a railroad crossing gate, the combination of a gate; counter weights for raising the gate; an electric motor for lowering the gate; an electric circuit for said motor that is adapted to be closed by a train when it is approaching the crossing; a switch in the motor circuit that is adapted to be opened by the gate mechanism when the gate has reached its closed position; a solenoid operated means for releasing the gate from its closing mechanism, so as to allow it to be raised by the action of said counter weights; an electric circuit for said solenoid adapted to be closed by the train when it has passed the crossing; a switch in said solenoid circuit that is adapted to be opened by another train that is approaching the crossing; and a source of electricity that is located upon a train passing the crossing and that is adapted for operating said electric circuits.

4. In a railroad crossing gate, the combination of a gate; counter weights for raising the gate; an electric motor for lowering the gate; an electric circuit for said motor which includes a conductor located near the railroad track, and parallel thereto, and adapted for making electrical contact with a conducting member on a train approaching the crossing; means for opening the motor circuit when the gate has reached its closed position; a solenoid adapted for releasing the gate from its closing mechanism, so as to allow it to be raised by the action of said counter weights; an electric circuit for said solenoid which includes a conductor located near the railroad track, and parallel thereto, and adapted for making electrical contact with a conducting member on a train that has passed the crossing; means for preventing the closing of the solenoid circuit when a train is approaching the crossing; a source of electricity that is adapted to be located upon a train passing the crossing, and that is adapted for operating said electric circuits; and a conducting member on said train that is connected to said source of electricity and adapted to make electrical contact with said conductors located near and parallel to the track.

5. In a railroad crossing gate, the combination of a gate; electrical means for causing said gate to open; an electric circuit for said means that includes a source of power and a switch whereby said circuit may be broken; and electrical means for causing said switch to break said circuit when a train is approaching the crossing.

RUSSELL H. LONGBRAKE.

Witnesses:
I. E. DODGE,
CHAS. D. PURDY.

Copies of this patent may be obtained for five cents each, by addressing the "Commissioner of Patents, Washington, D. C."